United States Patent
Brown

(10) Patent No.: US 10,463,086 B2
(45) Date of Patent: Nov. 5, 2019

(54) OUTERWEAR GARMENT WITH SEMI-REMOVABLE FRONT PANELS

(71) Applicant: Vanessa Danielle Brown, Ardmore, PA (US)

(72) Inventor: Vanessa Danielle Brown, Ardmore, PA (US)

( * ) Notice: Subject to any disclaimer, the term of this patent is extended or adjusted under 35 U.S.C. 154(b) by 0 days.

(21) Appl. No.: 14/555,549

(22) Filed: Nov. 26, 2014

(65) Prior Publication Data
US 2015/0181953 A1    Jul. 2, 2015

Related U.S. Application Data

(60) Provisional application No. 61/909,369, filed on Nov. 26, 2013.

(51) Int. Cl.
| *A41D 11/00* | (2006.01) |
| *A41D 13/00* | (2006.01) |
| *A41D 27/02* | (2006.01) |
| *B60N 2/26* | (2006.01) |
| *B60N 2/28* | (2006.01) |

(52) U.S. Cl.
CPC .............. *A41D 11/00* (2013.01); *B60N 2/265* (2013.01); *A41D 13/0007* (2013.01); *A41D 27/02* (2013.01); *B60N 2002/2815* (2013.01); *B60N 2002/2818* (2013.01)

(58) Field of Classification Search
CPC ..... A41D 11/00; A41D 13/0007; A41D 27/02
USPC .......... 2/69, 70, 71, 75, 78.4, 80, 85, 86, 96
See application file for complete search history.

(56) References Cited

U.S. PATENT DOCUMENTS

| 2,291,861 | A | * | 8/1942 | Astrove | A41B 13/005 2/80 |
| 2,588,542 | A | * | 3/1952 | Kunz | A41B 13/005 2/80 |
| 3,771,169 | A | * | 11/1973 | Edmund | B63C 11/04 2/125 |
| 4,122,553 | A | * | 10/1978 | Pitkanen | A41D 27/10 2/102 |
| 4,422,186 | A | * | 12/1983 | Loney | A41D 13/129 2/114 |
| 4,715,068 | A | * | 12/1987 | Jacobson | A41D 27/04 2/272 |
| 4,754,500 | A | * | 7/1988 | Brucato | A41D 13/1236 2/105 |
| 4,843,647 | A | * | 7/1989 | Phillips, Sr. | A41D 15/04 2/115 |
| 4,999,850 | A | * | 3/1991 | Grilliot | A41D 13/00 2/126 |
| 5,023,952 | A | * | 6/1991 | Palmer | A41B 13/005 2/69 |
| 5,131,096 | A | * | 7/1992 | Olson | A41D 15/00 2/69 |

(Continued)

*Primary Examiner* — Alissa J Tompkins
*Assistant Examiner* — Cameron A Carter
(74) *Attorney, Agent, or Firm* — Devlin Law Firm LLC; James M. Lennon

(57) ABSTRACT

This outerwear garment makes traveling while clothed in outerwear and restrained in a car seat restraint device safer for children and adults. By allowing the partial removal and repositioning of the front of the garment, proper security of car seat restraints can be achieved while keeping the wearer warm, and without necessitating full removal of the garment.

10 Claims, 5 Drawing Sheets

(56) References Cited

U.S. PATENT DOCUMENTS

| | | | | |
|---|---|---|---|---|
| 5,621,917 A * | 4/1997 | Howsden | A41B 13/06 | 2/111 |
| 6,119,270 A * | 9/2000 | Chou | A41D 3/00 | 2/108 |
| 6,272,683 B1 * | 8/2001 | Symms | A41B 13/06 | 2/69.5 |
| 6,401,248 B1 * | 6/2002 | Christensen | A41D 3/08 | 2/69 |
| 6,665,878 B1 * | 12/2003 | Way | A41D 3/02 | 2/84 |
| 6,782,560 B1 * | 8/2004 | Ascherl | A41D 13/1263 | 2/456 |
| 6,792,622 B2 * | 9/2004 | Graves | A41D 13/1245 | 2/114 |
| D526,467 S * | 8/2006 | Kent | D2/828 | |
| 7,117,539 B1 * | 10/2006 | Baacke | A41D 1/04 | 2/102 |
| 7,246,392 B2 * | 7/2007 | Schmid | A41B 13/06 | 2/69.5 |
| D612,126 S * | 3/2010 | Milgrom | D2/720 | |
| D635,334 S * | 4/2011 | Eckman | D2/847 | |
| D635,335 S * | 4/2011 | Eckman | D2/849 | |
| 8,225,422 B1 * | 7/2012 | McSparron | A41B 13/005 | 2/67 |
| 8,479,315 B2 * | 7/2013 | Kelling | A41D 15/04 | 2/69 |
| 8,832,864 B1 * | 9/2014 | Braden | A41D 13/1272 | 2/114 |
| 2002/0124296 A1 * | 9/2002 | Lipsett | A41D 3/02 | 2/84 |
| 2003/0079270 A1 * | 5/2003 | Bailey | A41B 13/06 | 2/69.5 |
| 2003/0126668 A1 * | 7/2003 | Scroggins | A41D 13/1236 | 2/114 |
| 2005/0017566 A1 * | 1/2005 | Rizk | A41D 11/00 | 297/465 |
| 2006/0150298 A1 * | 7/2006 | Jones | A41D 3/00 | 2/93 |
| 2006/0185055 A1 * | 8/2006 | DeWitt | A41D 13/08 | 2/111 |
| 2008/0196141 A1 * | 8/2008 | Osborne | A41B 13/06 | 2/111 |
| 2010/0125930 A1 * | 5/2010 | Burrell, IV | A41B 13/08 | 2/75 |
| 2010/0299798 A1 * | 12/2010 | Fayle | A41D 27/10 | 2/69 |
| 2014/0132055 A1 * | 5/2014 | Jenkins | B60N 2/265 | 297/465 |
| 2015/0020288 A1 * | 1/2015 | Picot | A41D 13/129 | 2/69 |

* cited by examiner

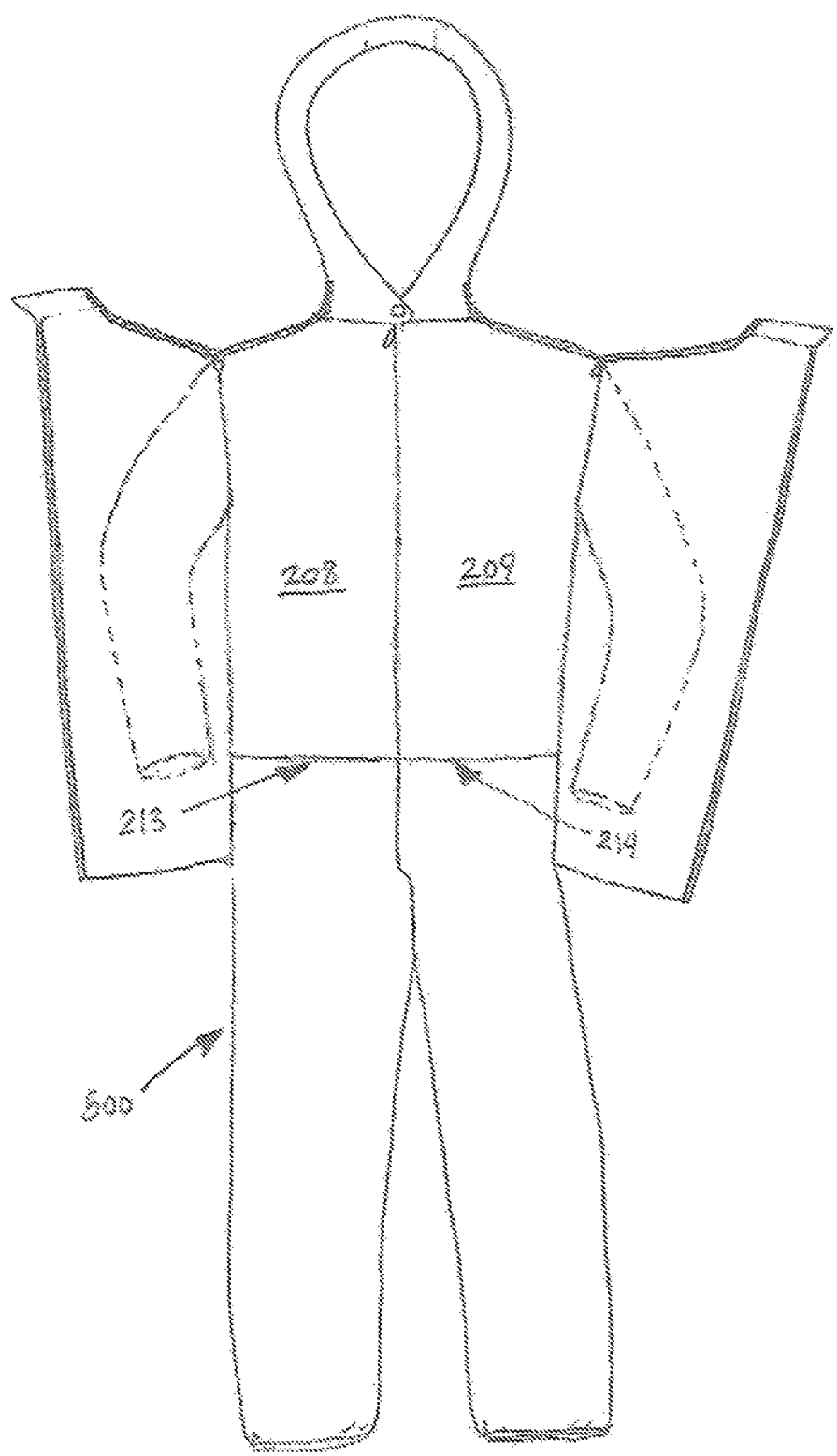

OUTERWEAR GARMENT WITH SEMI-REMOVABLE FRONT PANELS

CROSS REFERENCE TO RELATED APPLICATION

Provisional Utility Patent application 61/909,369 "Outerwear garment with removable front panels"

BACKGROUND OF THE INVENTION

Field of the Invention
The Field of the invention pertains to outerwear garments worn by children and adults Technical Problem
Each year thousands of individuals, (including children) are seriously injured or die in automobile accidents due to injuries sustained because of being improperly restrained in automobile restraint systems (e.g. car seats). The prevalence of this phenomenon has dangerous potential for increase during cold-weather months because of the need for the use of outerwear garments (jackets, vests, parkas, cloaks) during road travel. When worn by a child restrained in a car seat restraint device, the vast majority of conventional outerwear garments create bulk and uncompressed space between the car seat restraint straps and the body of the wearer. The presence of such bulk and space between the car seat restraint device straps and the wearer makes the security of the wearer being restrained precarious and unreliable as it increases the potential for space compression and resulting ejection of the person previously restrained in the event of an automobile accident. For this reason, the use of conventional outerwear garments is strongly discouraged by the car seat device manufacturer industry.

Caregivers who are aware of this danger have tried a number of different limited strategies for keeping their children restrained properly while at the same time keeping them warm during the course of cold-weather travel. Many caregivers allow their children to wear their conventional outerwear garment outdoors in the elements while transitioning to the vehicle, but then remove the garment to insure proper security in the car seat restraint device. Blankets or even the conventional outerwear garments themselves are often then placed unsecured on top of the restrained child for warmth. This option is safer, but cumbersome and time-consuming, especially for caregivers who have to repeat this process for more than one child. Additionally the removal of this important outer-layer of clothing from a child in cold and inclement weather can cause significant discomfort to the child, as well as the caregiver who may be directly exposed to the elements themselves while assisting the child in this potentially lengthy process, as well as the process to re-dress the child to exit the vehicle back into the outside elements.

STATE OF THE ART

Other concepts have been proposed and brought to market that attempt to solve the problem of safety compatibility of outerwear garments with travel restraint device systems, but those proposed heretofore are limited in their safeness, practical use, or versatility.

An example of this practical-use and safeness inadequacy is the concept disclosed in U.S. Pat. No. 8,225,422 B1. The garment described is designed with a permanently-open chest area which renders it impractical for use as a conventional outerwear garment, necessitating the dressing and undressing of the wearer into a garment that is equipped for extended cold-weather outdoor use. Furthermore, the garment described in the disclosure adds a layer of insulating fabric in the seat area of the wearer, at the point where a buckle strap of a car seat safety restraint device system would make contact during use. The presence of this fabric layer between a strap of the car seat and the wearer is inherently a reduction in safety and in direct contrast to the objective (or concept) of safety.

Another example of a practical-use inadequacy is the marketed product, Cozywoggle, whose related disclosure is US Patent US 20140132055 A1. The practical use of this invention is limited, as operating two closure devices that run the length of the garment from the end of the wrist aperture through to the bottom of either side of the garment (or in the reverse order) is potentially cumbersome and time-consuming because of the physical length of the garment that has to be secured or unsecured to use the garment as stated. The necessity and associated recommended process of completely removing the garment from the wearer's arms, back, and torso in order for the wearer to be properly restrained in the car seat (leaving only the head and neck covered by the garment) is akin to the undressing necessary for conventional outerwear garments during car seat use, thus making the marketed claim of convenience a dubious one. This invention is also limited in its ability to keep the wearer's upper body fully warm and clothed during use, as large adjacent portions of the sleeves, back, and torso area must remain disjoined, separated, and removed from the wearer's body during use. In the disclosed method of use comprising of completely breaking the annular form of the wrist apertures during use, no consideration is given to the potential or likelihood of complete removal of the garment by the wearer through the head aperture, potentially eliminating any insulatory benefits, as in said method, only the neck is completely encircled by any portion of the garment. In general, maneuvering the wearer of the invention in the manner necessary for recommended use (i.e., raising the child's arms to operate closure devices, bending child forward at the waist to remove back portion from behind and lift said back portion over the seat back) is inconsistent with and unreasonably outside the scope of what is commonly necessary for securing a child in a safety restraint system.

BRIEF SUMMARY OF INVENTION

The outerwear garment described has semi-removable panels which have the ability to be fully withdrawn from the torso, without undressing any other area of the wearer's body, allowing for uninhibited access and security of safety restraint device straps and minimal space between the wearers chest, torso, and hips and the straps of a safety restraint. These panels can be temporarily replaced over secured safety restraint straps during restraint to minimize exposure to the weather elements during travel. When the utility of the invention is no longer needed (e.g., the wearer is no longer restrained in a safety restraint device), the semi-removable panels of the garment can be securely, yet movably, re-joined to the garment shell to allow the wearer to resume use as a conventional outerwear garment.

The garment has one or more semi-removable panels that open to expose the wearer's body in the areas where close contact with car seat safety restraint system straps is recommended for proper security, including the chest, torso, and hips. The invention functions by having closure devices, which can include zippers, down the front of the garment and on one or either side of the garment in the shoulder area, toward the top of the semi-removable panel(s), that unfasten from collar area laterally, stopping proximally to where the shoulder portion meets the top of the tubular sleeve or arm aperture relative, to it. There can be secondary fasteners (e.g. snaps, buttons, etc.) which allow for the panel(s) to be temporarily reattached back in theft original position, to recover the previously exposed areas of the wearer's body, while the invention is in use. There can be an underlying, fabric portion of the garment, under the semi-removable torso panels, to which portions of the hood, collar, shoulders, and/or areas of the garment shell and/or lining which border the semi-removable panels are attached. The purpose of this underlying fabric is to maintain the placement and structure of the garment on the wearer while one or more of the closure devices are disengaged.

ADVANTAGEOUS EFFECTS OF THE INVENTION

There are many benefits that the invention outlined in this disclosure creates. Principally, the utility of the semi-removable panels allows for the wearer of the garment to be harnessed properly in a safety restraint device without interfering with the restraint straps' ability to make uninhibited contact with the wearer in the chest, torso, and hip areas. The utility of this outerwear garment can be realized quickly and completely without moving or altering the majority of garment from the wearer and hence eliminates the need to undress the wearer and expose them to the elements in order to achieve proper use. The designed use of the proposed invention also allows for the face, anterior of the neck, torso, and hips of the wearer to be fully exposed whenever necessary, without hindering the usefulness of the invention. Additionally, the invention allows the portions of the wearer's torso that require exposure for safety restraint device straps to be properly secured to be completely recovered in the closed tubular structure of the garment while restrained and while the invention is in use, providing full and appropriate insulation during cold-weather. The garment can also be used outdoors in cold and inclement weather in the same manner as a conventional outerwear garment. When used properly and in conjunction with a properly installed and harnessed safety restraint system, the invention has the potential to make traveling while wearing outerwear safer for the wearer than what is afforded by a conventional outerwear garment and more practical, convenient, and versatile than other inventions with similarly stated objective use.

BRIEF DESCRIPTION OF EMBODIMENTS

Figure 3:
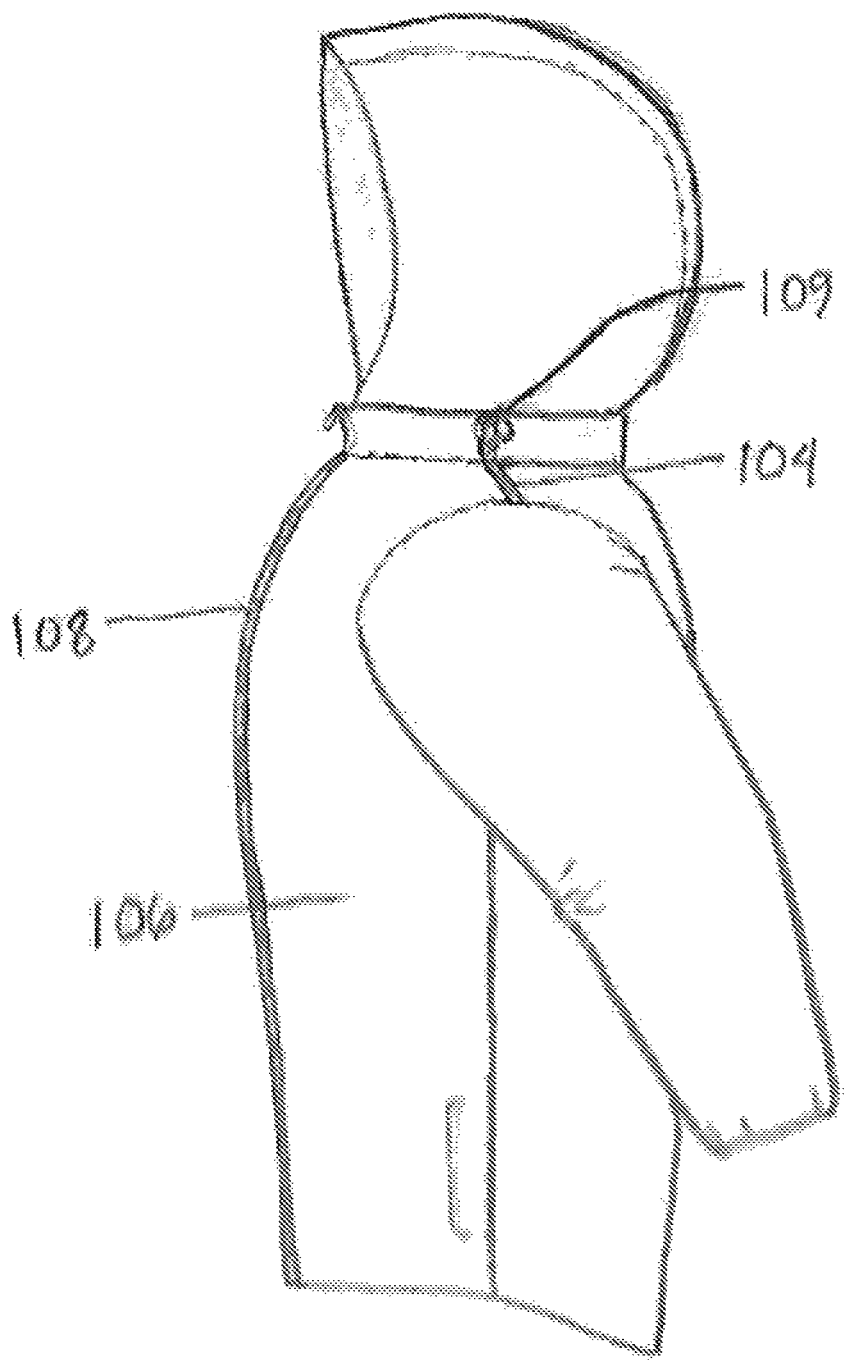
Figure 4:
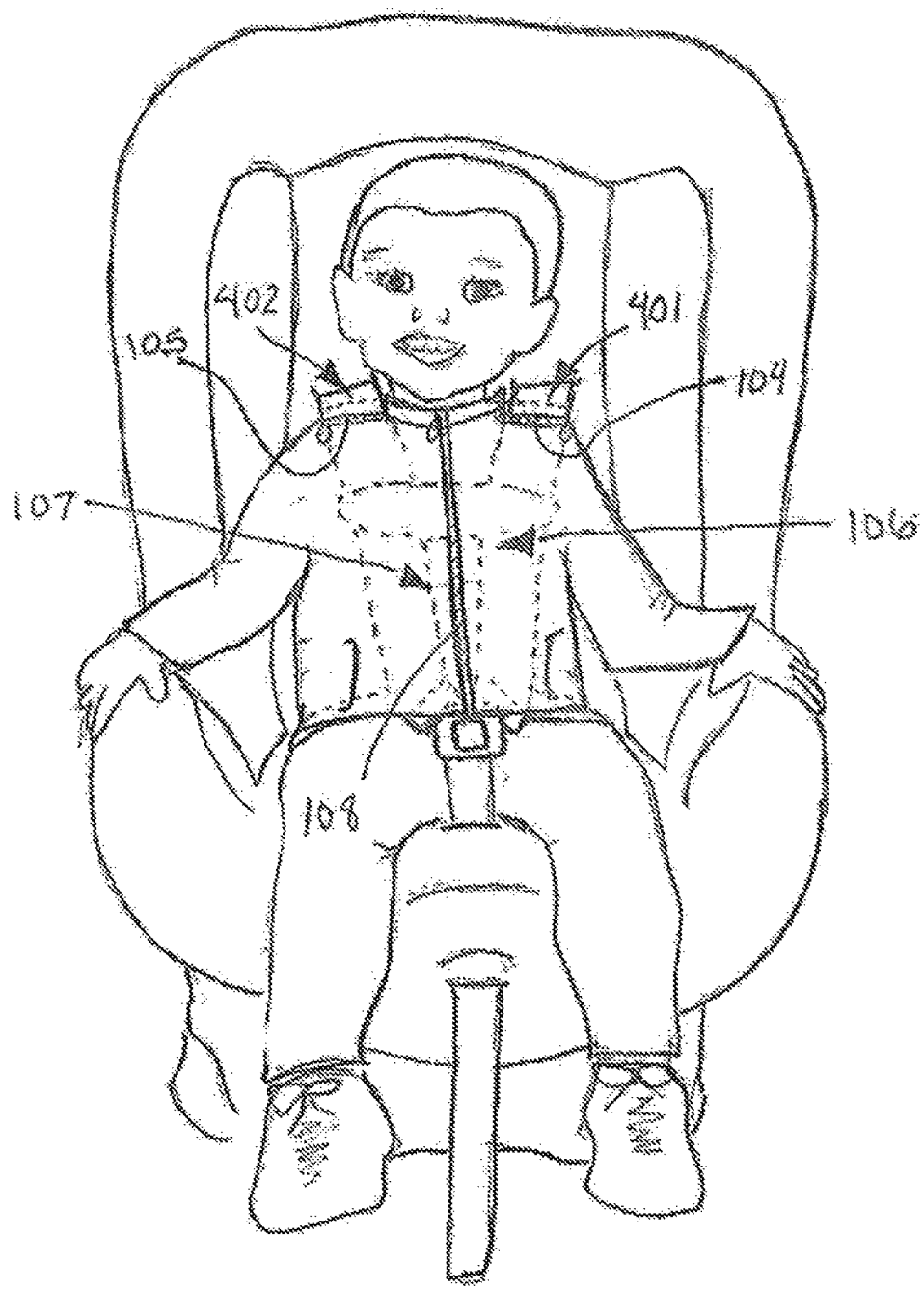

FIG. 3 is a side elevation view of a garment with semi-removable panels attached in original position in accordance with a preferred embodiment of the present invention FIG. 4 is a front perspective view of a subject wearing a garment in accordance with a preferred embodiment and employing the invention in an intended use FIG. 5 is a front elevation view of a garment with semi-removable panels in accordance with an embodiment which contains leg portions.

DETAILED DESCRIPTION OF DRAWINGS

Reference is made herein to the attached drawings. Like reference numerals are used throughout the drawings to depict like or similar elements of the garment with semi-removable panels. For the purposes of presenting a brief and clear description of the present invention, the preferred embodiment will be discussed as used for optimal fit and effectiveness for the user. The figures are intended for representative purposes only and should not be considered to be limiting in any respect.

Figure 1:
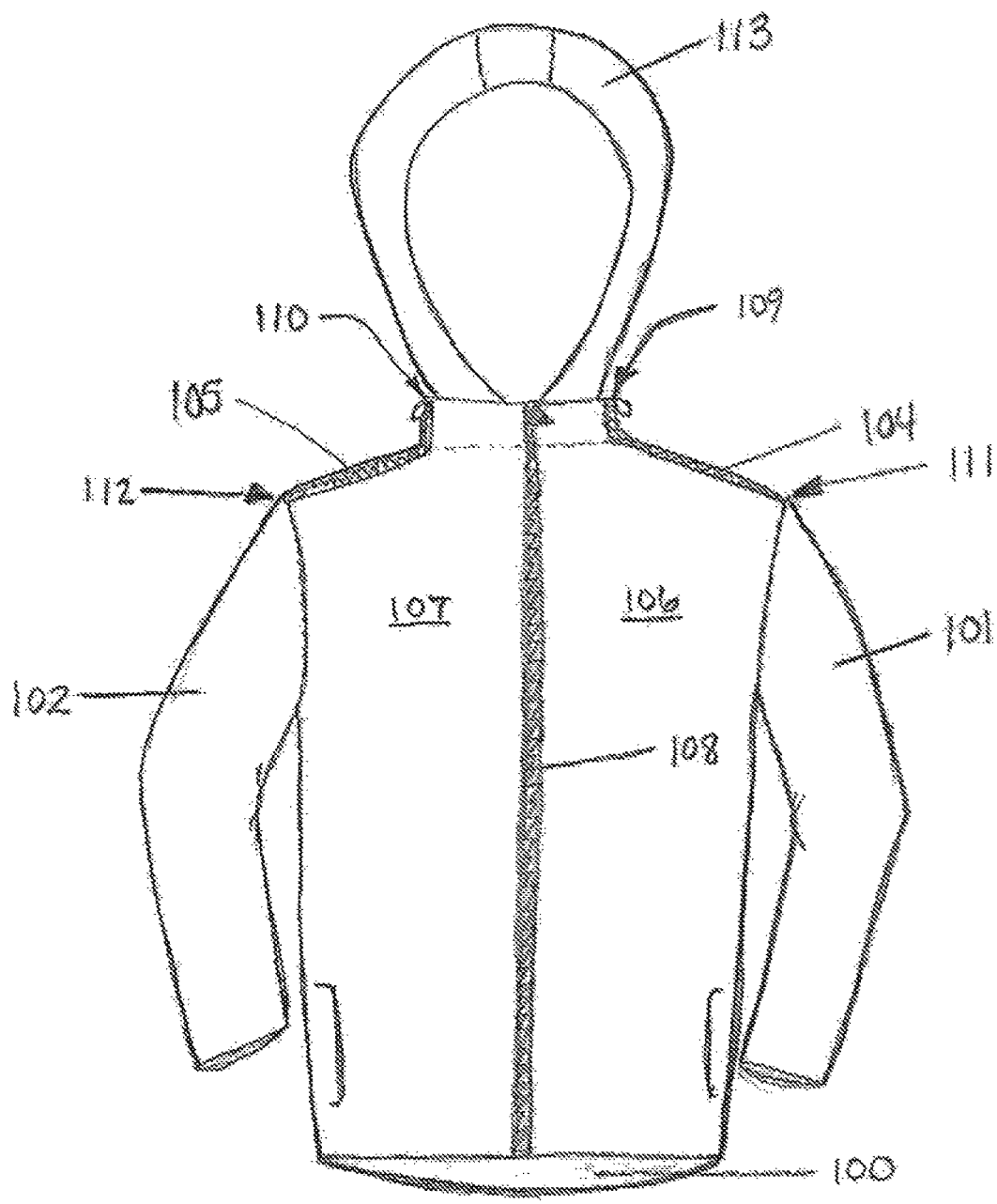
FIG. 1 is a front elevation view of a garment with semi-removable panels in accordance with a preferred embodiment of the present invention.

Referring to FIG. 1, herein is shown a frontal elevation view of a preferred embodiment of the jacket, in an original position showing components including a back panel 100, left and right semi-removable anterior panels 106 and 107, left and right sleeves 101 and 102, left and right uppermost zipper closures 104 and 105 which open the shoulder and neck area along the space spanning from left and right proximal zipper closure terminal points 109 and 110 at the collar top to outermost zipper closure terminal points 111 and 112 at the outer left and right shoulders. Also displayed in this view are the primary front zipper closure of the jacket 108, which connects the anterior semi-removable panels and allows for the user to wear and remove the garment in the same manner as a conventional outerwear garment, as well as a hood 113.

Figure 2:
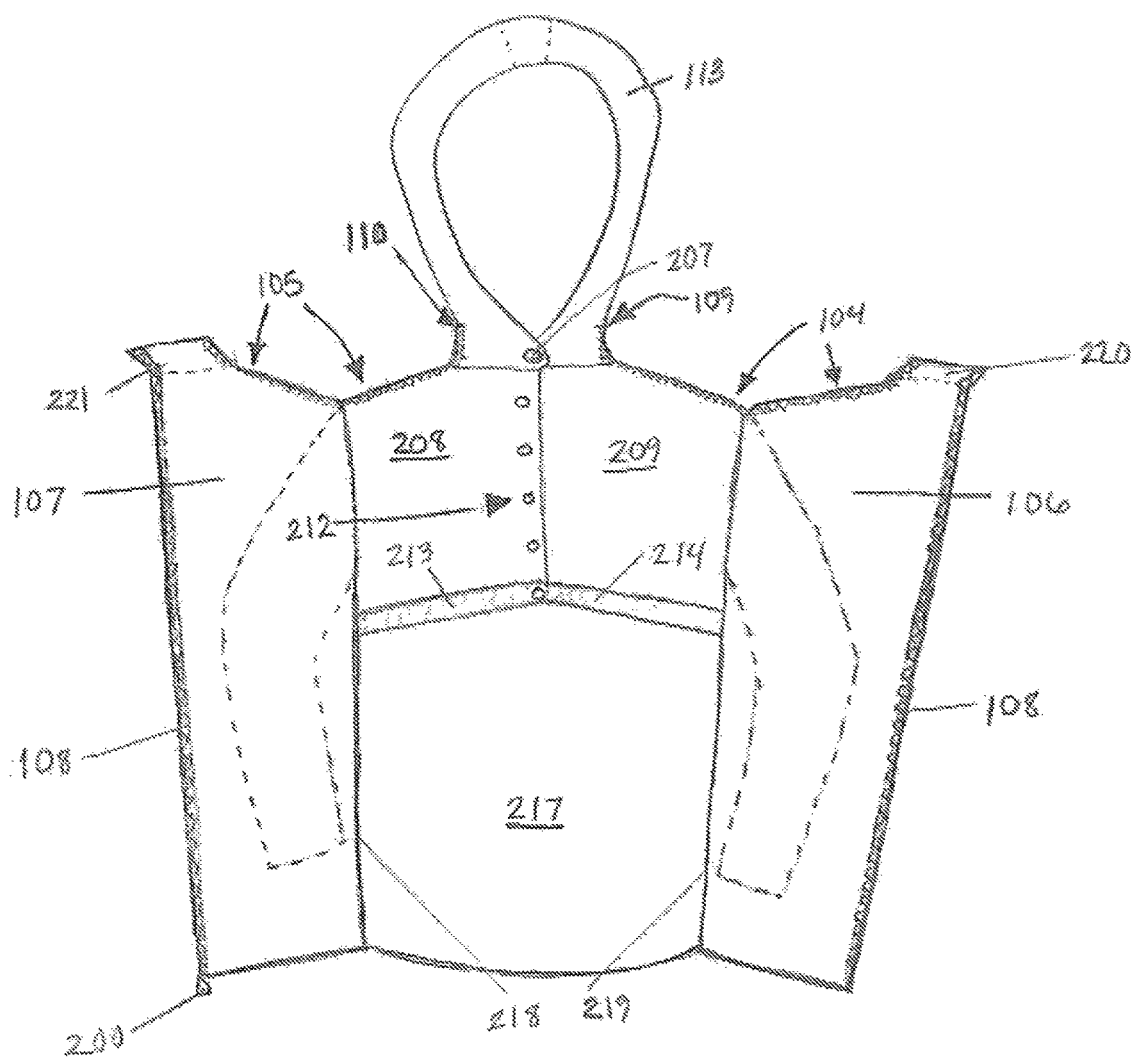
FIG. 2 is a front elevation view of a garment with semi-removable panels where the front panels have been removed to expose underlying components of the garment and illustrate the process of use for the chosen embodiment.

Referring now to FIG. 2, herein is shown a frontal elevation view of the jacket with left and right semi-removable panels 106 and 107 fully open with the inside left and right front semi-removable panels exposed. The primary closure structure 108 is fully disengaged as well as both the left and right uppermost zipper closures 104 and 105 in the shoulder area. Proximal left and right closure device terminal points 109 and 110 are seen here exposed at the collar level and permanently affixed to the garment. Also shown in this view is the semi-independent underlying fabric portion 208 and 209, which is designed to anchor the hood 113 and hood closure 207 and prevent shifting and movement of the jacket on the wearer while the primary fastener is disengaged. In this embodiment, the underlying fabric portion is shown secured with its own independent closure device 212 and with its bottom edge 213 and 214 just below chest level. Alternatively, in other embodiments of the invention (e.g., in a garment without a hooded portion or without tubular sleeves), this underlying fabric portion may be omitted or amended without limiting the functionality or scope of the invention. The back panel of the jacket 217 is permanently attached to the semi-removable panels with side seams 218 and 219 in similar fashion to how the shell components of traditional jackets are joined. Portions of the left and right front of the collar 220 and 221 are shown here permanently attached to the top of their respective semi-removable panels.

Referring now to FIG. 3, herein is shown a side perspective view of the invention in a preferred embodiment. The primary front closure device 108 and uppermost left shoulder closure device 104 are engaged and the garment, including the semi-removable panel 106 represented are in their original and closed positions. An uppermost shoulder closure device is also seen in this perspective view fully closed with its proximal terminal point 109 positioned at the top of the collar.

Now referring to FIG. 4, herein is shown a perspective example of the invention in a preferred embodiment engaged in use as worn by a subject who is restrained in a car seat safety restraint device. The uppermost shoulder closure devices 104 and 105 are disengaged to create the openings 401 and 402 which allows for car seat safety restraint straps to pass through and be secured as a part of the restraint system, close to the subject's body. This perspective further illustrates the ability for the garment to fully re-cover and enclose the subject's torso, shoulders, hips, and neck without hindering the safety restraint device system straps. This is achieved by opening the primary and uppermost shoulder closure devices, feeding each independent semi-removable anterior panel under the respective left and right safety restraint straps, securing the wearer in the safety restraint device, and replacing the semi-removable panels over the wearer who has been secured in the safety restraint device, and rejoining them in via the primary closure device 108 of the garment, covering both the wearer and the secured straps.

Lastly in this disclosure, now referring to FIG. 5, herein is shown an embodiment of the invention with the semi-independent underlying fabric portion 208 and 209 of the garment attached at its bottom edge 213 and 214 to a lower portion of the garment 500 designed to encircle the wearer's lower extremities. In this embodiment, tubular leg portions are shown attached to the jacket portion of the garment at the waist level to create a complete garment that encircles the wearer contiguously from the uppermost aperture through and including the areas of the trunk, pelvis, buttocks, as well as at least part of each leg of the wearer.

Therefore, the foregoing is considered as illustrative only of the principles of the invention. Further, since various modifications and changes will readily occur to those skilled in the art, it is not intended to limit the invention to the exact construction and operation shown and described, and accordingly, all suitable modifications and equivalents may be resorted to, falling within the scope of the invention.

PATENT REFERENCE LISTING

1) Car seat coat. U.S. Pat. No. 8,226,422 B1
2) Garment, system and method for using the same. US Patent No. US 20140132055 A10.

The invention claimed is:
1. A jacket to be worn by a human person comprising:
a posterior torso portion, an anterior torso portion, shoulder portions whereto the torso portions are connected to form a bust capable of fully encircling the torso of a wearer, left arm aperture, right arm aperture, and head aperture;
the anterior torso portion containing multiple layers of fabric material, including at least one interior layer and at least one exterior layer, wherein the interior layer has right-side and left-side fabric portions configured to be fastened along a first vertical centerline;
wherein the exterior layer of the anterior torso portion contains right-side and left-side semi-detachable anterior panels that open away from a second vertical centerline of the anterior torso portion and wherein the right-side semi-detachable anterior panel attaches to the interior layer along a right-side side seam and the left-side semi-detachable anterior panel attaches to the interior layer along a left-side side seam;
the panels containing one or more closure devices located at the top of a shoulder area of the jacket and one or more closure devices located along the second vertical centerline of the anterior torso portion of the jacket to enable partial detachment of the panels of the exterior layer from the interior layer.

2. The jacket of claim 1, wherein the closure device on each panel extends to a shoulder point adjacent the arm aperture.

3. The jacket of claim 1, wherein the closure device continues downwardly along the edge of each panel that is proximate to the second vertical centerline of the anterior torso portion of the jacket, continuing to a bottom edge of each panel.

4. The jacket of claim 1, wherein interior fabric layer contains a closure device component that corresponds to the closure device located on the semi-detachable anterior panels.

5. The jacket of claim 1, wherein the jacket further contains a hood portion that is detachable from the jacket.

6. The jacket of claim 1, wherein the jacket further contains a pair of tubular arm sleeves that are detachable from the jacket.

7. The jacket of claim 1, wherein the jacket further contains a pair of tubular legs that are detachable from the jacket.

8. The jacket of claim 7, wherein the tubular legs that are detachable from the interior layer.

9. The jacket of claim 7, wherein the tubular legs that are detachable from the exterior layer.

10. A jacket designed for use with a child safety restraint system in an automobile, the jacket comprising:
an interior layer positioned at least along an anterior portion of jacket, wherein the interior layer has right-side and left-side fabric portions configured to be fastened along a first vertical centerline, and wherein the interior layer is configured to be sufficiently thin to avoid the potential for space compression between one or more safety belts of the child safety restraint system and an occupant of the restraint system to reduce the risk of ejection of the occupant of the restraint system;
an exterior layer of the jacket comprising right-side and left-side rectangular panels that permanently connect to the jacket along one of four sides of each panel and detachable connected to the jacket along three of four sides of the panel, wherein the permanent connection of the panel to the jacket extends along a vertical line extending below a shoulder region of the jacket downwardly to a waist region of the jacket, and wherein the right-side rectangular panel attaches to the interior layer along a right-side side seam and the left-side rectangular panel attaches to the interior layer along a left-side side seam;
wherein the rectangular panels are configured to remain detached from the jacket along three of the four sides of the rectangular panels to avoid obstruction while the occupant is being fastened into the restraint system; and
wherein the three detachable sides of the rectangular panels are configured to be reattached to the jacket once the occupant is safely fastened into the restraint system.

* * * * *